US008548914B2

(12) United States Patent
Sinton et al.

(10) Patent No.: US 8,548,914 B2
(45) Date of Patent: Oct. 1, 2013

(54) METHOD AND SYSTEM FOR PHOTO IDENTIFICATION IN A PAYMENT CARD TRANSACTION

(75) Inventors: James D. Sinton, Leigh-on-Sea (GB); Colin Robert Tanner, Middlesex (GB)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/174,158

(22) Filed: Jun. 30, 2011

(65) Prior Publication Data

US 2013/0006857 A1    Jan. 3, 2013

(51) Int. Cl.
*G06Q 20/00* (2012.01)
*G06Q 40/00* (2012.01)

(52) U.S. Cl.
USPC .............................................. 705/44; 705/67

(58) Field of Classification Search
USPC ...................................................... 705/44, 67
See application file for complete search history.

(56) References Cited

U.S. PATENT DOCUMENTS

| 7,207,480 | B1* | 4/2007 | Geddes ........................ 235/380 |
| 7,398,925 | B2 | 7/2008 | Tidwell et al. |
| 8,112,313 | B1* | 2/2012 | Barakat ........................... 705/16 |
| 2002/0073029 | A1* | 6/2002 | Cheaib et al. .................. 705/41 |
| 2004/0059923 | A1* | 3/2004 | ShamRao ...................... 713/186 |
| 2005/0080717 | A1 | 4/2005 | Belyi et al. |
| 2006/0064380 | A1* | 3/2006 | Zukerman ....................... 705/44 |
| 2006/0069922 | A1* | 3/2006 | Jelinek et al. ................. 713/186 |
| 2009/0171836 | A1* | 7/2009 | Olliphant et al. ............... 705/39 |
| 2010/0030696 | A1* | 2/2010 | Naccache ........................ 705/71 |
| 2010/0084462 | A1* | 4/2010 | Scipioni et al. ............... 235/380 |
| 2011/0010470 | A1* | 1/2011 | Hulbert et al. .................. 710/13 |
| 2011/0121071 | A1* | 5/2011 | Zeigler .......................... 235/380 |
| 2011/0302089 | A1* | 12/2011 | McKenzie ...................... 705/75 |

FOREIGN PATENT DOCUMENTS

| EP | 2065798 A1 * | 3/2009 |
| WO | WO2011/068912 | * 6/2011 |

OTHER PUBLICATIONS

"Benefits of Open Payment Systems and the Role of Interchange", www.mastercardworldwide.com, 2008, 14 pages.*
"The Mechanics of Credit Card Transactions", Ensight Merchant Services, 3 pages, 2009.*
Yildiz et al. (Combining Biometric ID Cards and Online Credit Card Transactions, 2010 Fourth International Conference on Digital Security, IEEE Computer Society, Sep. 2010, 5 pages (pp. 20-24.*

* cited by examiner

*Primary Examiner* — James D Nigh
(74) *Attorney, Agent, or Firm* — Armstrong Teasdale LLP

(57) ABSTRACT

A method and system for a photo ID payment card transaction verification system for use with a payment card interchange network is provided. The system is programmed to receive a photo of a cardholder, the photo verified to be of the cardholder, assign a unique photo identifier to the photo, the unique photo identifier associated with the cardholder's payment card account, receive payment card transaction information for a payment cardholder from the interchange network, the interchange network configured to process payment card transactions between a merchant through a merchant bank and a cardholder through an issuer bank, the payment card transaction information including data relating to a purchase of goods or services made by the cardholder at a merchant, and transmit at least one of the photo and an access to the photo to the merchant with an authorization request response during a payment card transaction.

19 Claims, 10 Drawing Sheets

METHOD AND SYSTEM FOR PHOTO IDENTIFICATION IN A PAYMENT CARD TRANSACTION

BACKGROUND OF THE INVENTION

The field of the invention relates generally payment card transaction systems and, more particularly, to network-based methods and systems for securely obtaining, maintaining, and transmitting a digital photograph of a payment card account holder for comparison to a user using the payment card in a transaction.

During a payment card transaction, a customer or user of the card presents to a seller or merchant a payment card, typically a debit or credit card having, e.g., a magnetically encoded strip on its surface, and the card is "swiped" or scanned with another device usually provided by the seller, e.g., a point of sale (POS) device that reads the card to obtain the buyer's identity and account number at an "issuer" institution, such as a bank, credit card company or other service provider, which the buyer wishes to use to pay for the goods or services. The buyer may then be presented with a receipt form that the buyer signs with their signature to authenticate and confirm the transaction.

The buyer may further be required to present some form identification card, such as a driver's license, an identity card, a passport or other device issued by a trusted source that typically includes a photograph of the buyer that the seller can compare with the user of the card at the POS to verify the user's identity. At least some known identification cards are used in such transactions are altered by the user to be fraudulent such that the photograph is not of the true owner of the payment card.

BRIEF DESCRIPTION OF THE INVENTION

In one embodiment, a photo ID payment card transaction verification system for use with a payment card interchange network includes a memory device and a processor in communication with the memory device and is programmed to receive a photo of a cardholder, the photo verified to be of the cardholder, assign a unique photo identifier to the photo, the unique photo identifier associated with the cardholder's payment card account, receive payment card transaction information for a payment cardholder from the interchange network, the interchange network configured to process payment card transactions between a merchant through a merchant bank and a cardholder through an issuer bank, the payment card transaction information including data relating to a purchase of goods or services made by the cardholder at a merchant, and transmit at least one of the photo and an access to the photo to the merchant with an authorization request response during a payment card transaction.

In another embodiment, a method of reducing fraud in a payment card transaction system using a photo ID payment card transaction verification system wherein the method includes receiving a photo of a cardholder, the photo verified to be of the cardholder, assigning a unique photo identifier to the photo, the unique photo identifier associated with the cardholder's payment card account, receiving payment card transaction information for a payment cardholder from the interchange network, the interchange network configured to process payment card transactions between a merchant through a merchant bank and a cardholder through an issuer bank, the payment card transaction information including data relating to a purchase of goods or services made by the cardholder at a merchant, and transmitting at least one of the photo and an access to the photo to the merchant with an authorization request response during a payment card transaction.

In yet another embodiment, one or more non-transitory computer-readable storage media having computer-executable instructions embodied thereon, wherein when executed by at least one processor, the computer-executable instructions cause the processor to receive a photo of a cardholder, the photo verified to be of the cardholder, assign a unique photo identifier to the photo, the unique photo identifier associated with the cardholder's payment card account, receive payment card transaction information for a payment cardholder from the interchange network, the interchange network configured to process payment card transactions between a merchant through a merchant bank and a cardholder through an issuer bank, the payment card transaction information including data relating to a purchase of goods or services made by the cardholder at a merchant, and transmit at least one of the photo and an access to the photo to the merchant with an authorization request response during a payment card transaction.

BRIEF DESCRIPTION OF THE DRAWINGS

FIG. 1 is a schematic diagram illustrating an exemplary multi-party payment card industry system for enabling ordinary payment-by-card transactions in which merchants and card issuers do not necessarily have a one-to-one relationship.

FIG. 2 is a simplified block diagram of an exemplary system including a plurality of computer devices in accordance with one example embodiment of the present invention.

FIG. 3 is an expanded block diagram of an exemplary embodiment of a server architecture of the system including the plurality of computer devices in accordance with one example embodiment of the present invention.

FIG. 4 illustrates an exemplary configuration of a client system shown in FIGS. 2 and 3.

FIG. 5 illustrates an exemplary configuration of a server system shown in FIGS. 2 and 3.

FIG. 6 is a schematic diagram of the photo identification (ID) payment card transaction verification system shown in FIG. 2 in accordance with an exemplary embodiment of the present invention;

FIG. 7 is a schematic block diagram of the photo ID payment card transaction verification system shown in FIG. 2 in accordance with another exemplary embodiment of the present invention;

FIG. 8 is a schematic block diagram of the photo ID payment card transaction verification system shown in FIG. 2 in accordance with yet another exemplary embodiment of the present invention:

FIG. 9 is a schematic block diagram of photo ID payment card transaction verification system shown in FIG. 2 in accordance with still another exemplary embodiment of the present invention; and FIG. 10 is a schematic block diagram of photo ID payment card transaction verification system shown in FIG. 2 in accordance with still yet another exemplary embodiment of the present invention.

DETAILED DESCRIPTION OF THE INVENTION

Figure 1:
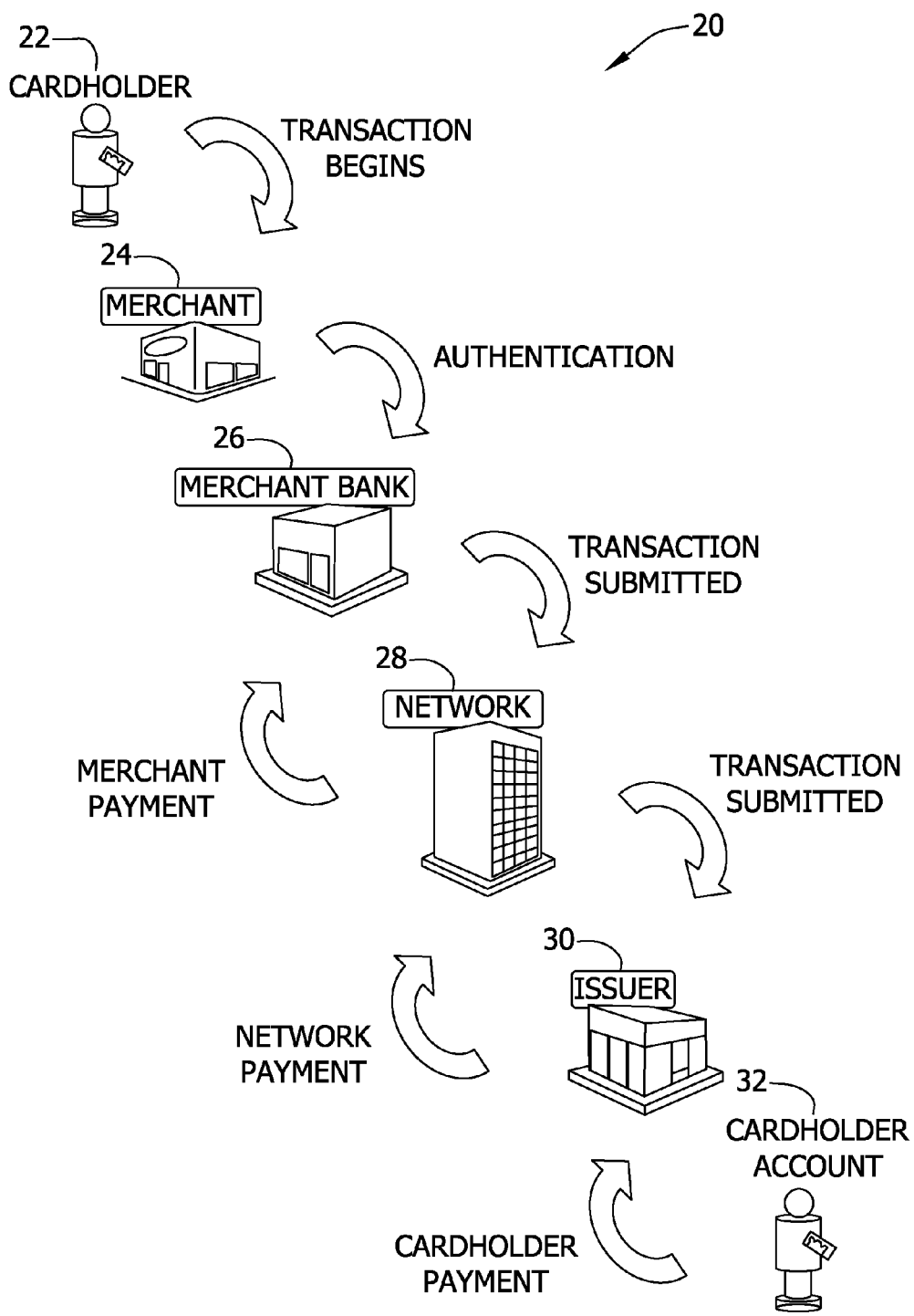
FIGS. 1-10 show exemplary embodiments of the method and apparatus described herein.

The following detailed description illustrates embodiments of the invention by way of example and not by way of limitation. It is contemplated that the invention has general application to securing a transaction using a biometric such as a verified facial photograph to facilitate identifying a party to the transaction. In embodiments of the present invention the photograph is securely acquired and stored until requested during a payment card transaction, wherein the photograph is then retrieved, associated with the payment card account holder and transmitted for verification. It is contemplated that the invention has general application to processing financial transaction data in industrial, commercial, and residential applications.

Embodiments of the methods and systems described herein relate to alternative payment card transaction security measures than the practice of a merchant requesting photo identification (ID) when accepting card payment. Embodiments of the present invention negate the need for the use of a photo ID carried by the cardholder, which could also be counterfeit, by sending a photo to the payment terminal (POS) or merchant till system from a secure server which holds the account details and a verified digital photo linked to the account. Cardholders initiate the security measures as a service by downloading a recent photo to the secure server and allow this to be sent during the payment card transaction. Merchants could either receive the photo by default every time they accept a card for payment or request that a photo is sent when they are suspicious or feel that further cardholder verification is required. Merchants have the final approval or decline for transactions sent with a photo as they can visually verify that the cardholder is the same person in the photo. Additional facial recognition technology may also be incorporated by acquired a photo of the cardholder during the transaction and transmitting both the acquired photo and the stored and verified photo to a facial pattern recognition system for scoring. The stored and verified photo and the score are transmitted to the merchant during the transaction to facilitate an approval decision.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a schematic diagram illustrating an exemplary multi-party transaction card industry system 20 for enabling ordinary payment-by-card transactions in which merchants 24 and card issuers 30 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the exemplary embodiment, when cardholder 22 purchases travel, such as airfare, a hotel stay, and/or a rental car, at least partial itinerary information is transmitted during the clearance process as transaction data. When interchange network 28 receives the itinerary information, interchange network 28 routes the itinerary information to database 120.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
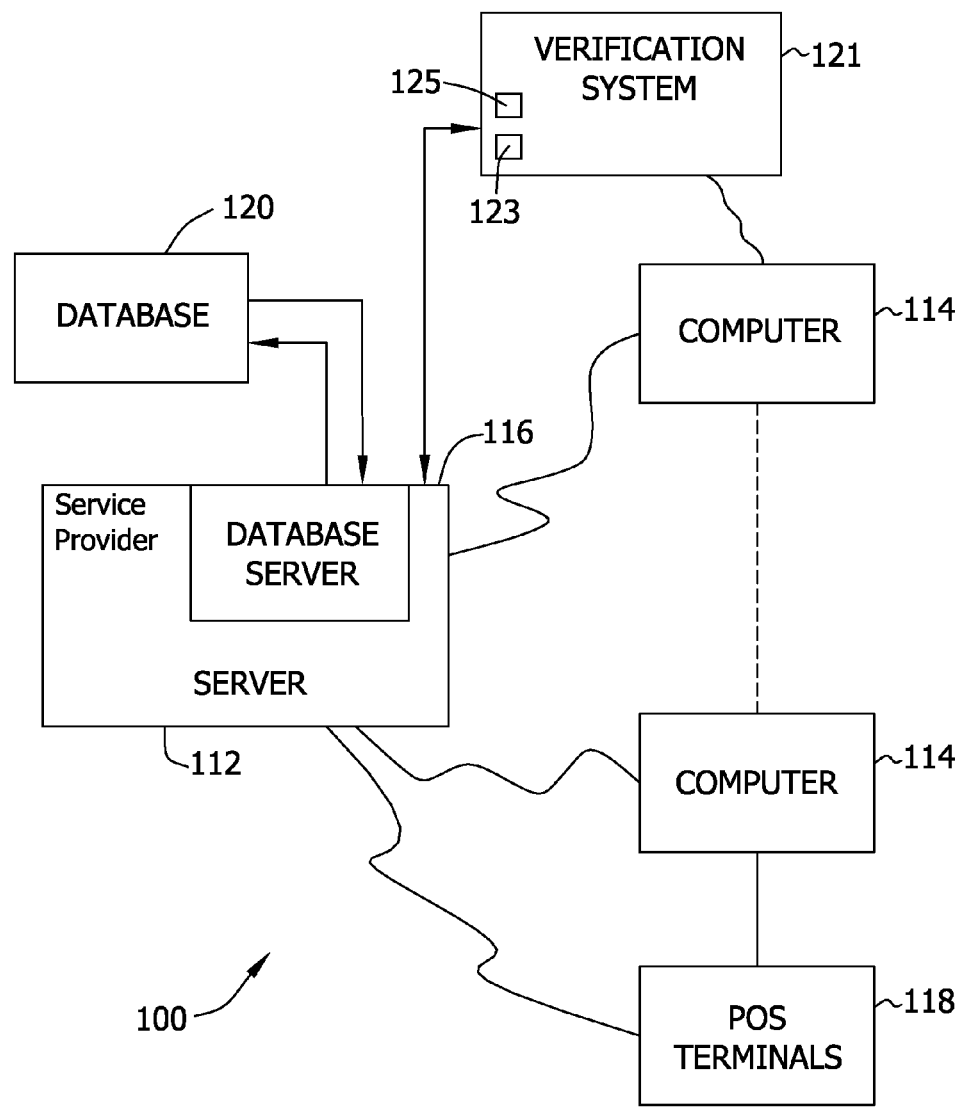

FIG. 2 is a simplified block diagram of an exemplary processing system 100 including a plurality of computer devices in accordance with one embodiment of the present invention. In the example embodiment, system 100 may be used for performing payment-by-card transactions received as of part processing the financial transaction.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28. In the exemplary embodiment, server system 112 is associated with a network interchange, such as interchange network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment system, and/or a biller. Further, a photo identification (ID) payment card transaction verification system 121 may be included in client systems 114 or optionally may be included in server system 112. In various embodiments, photo identification (ID) payment card transaction verification system 121 may be associated with a standalone processor or may be associated with a separate third party provider in a contractual relationship with interchange network 28 and configured to perform the functions described herein. Accordingly, each party involved in processing transaction data are associated with a computer system shown in system 100 such that the parties can communicate with one another as described herein.

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
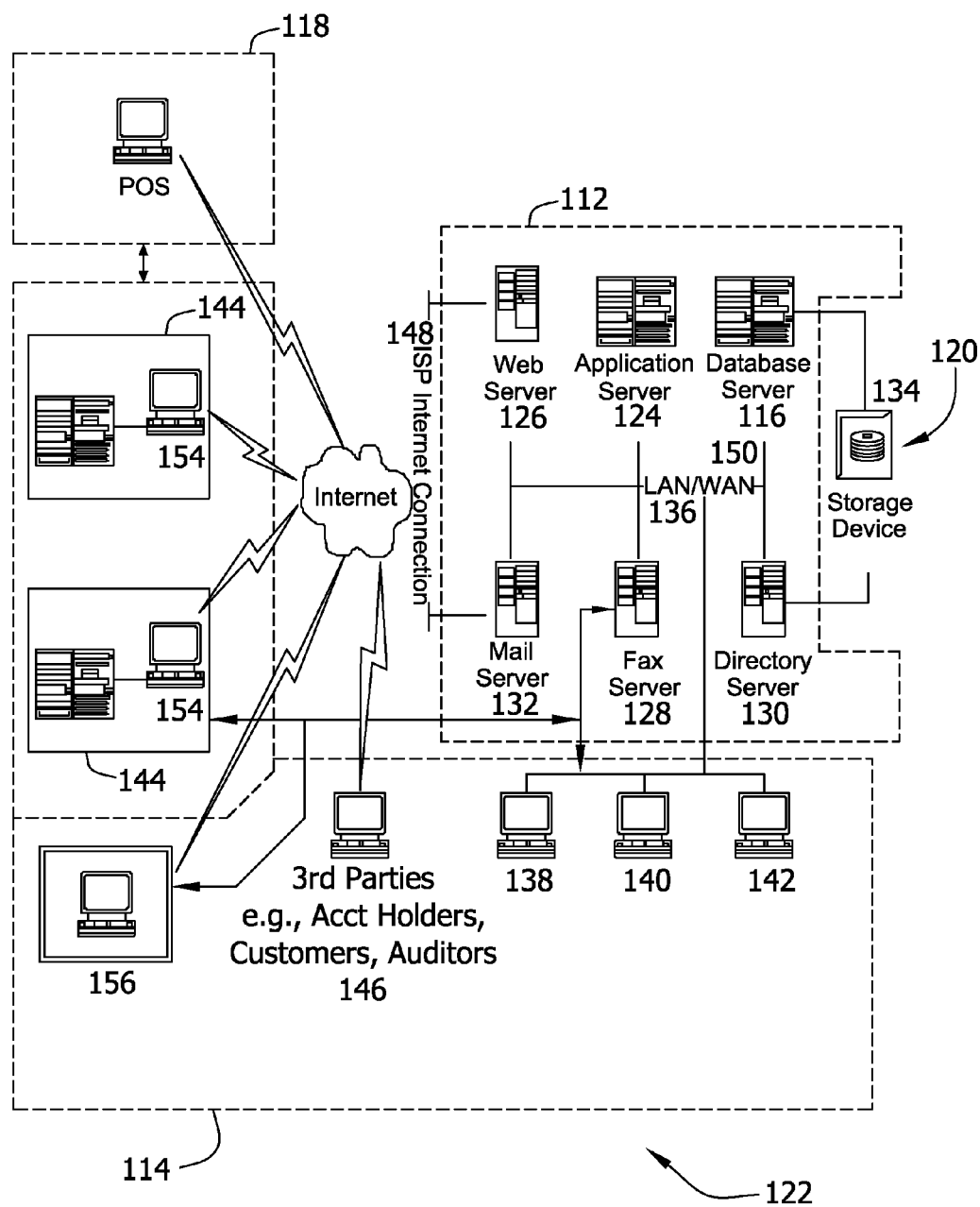

FIG. 3 is an expanded block diagram of an exemplary embodiment of a server architecture of a processing system 122 including other computer devices in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
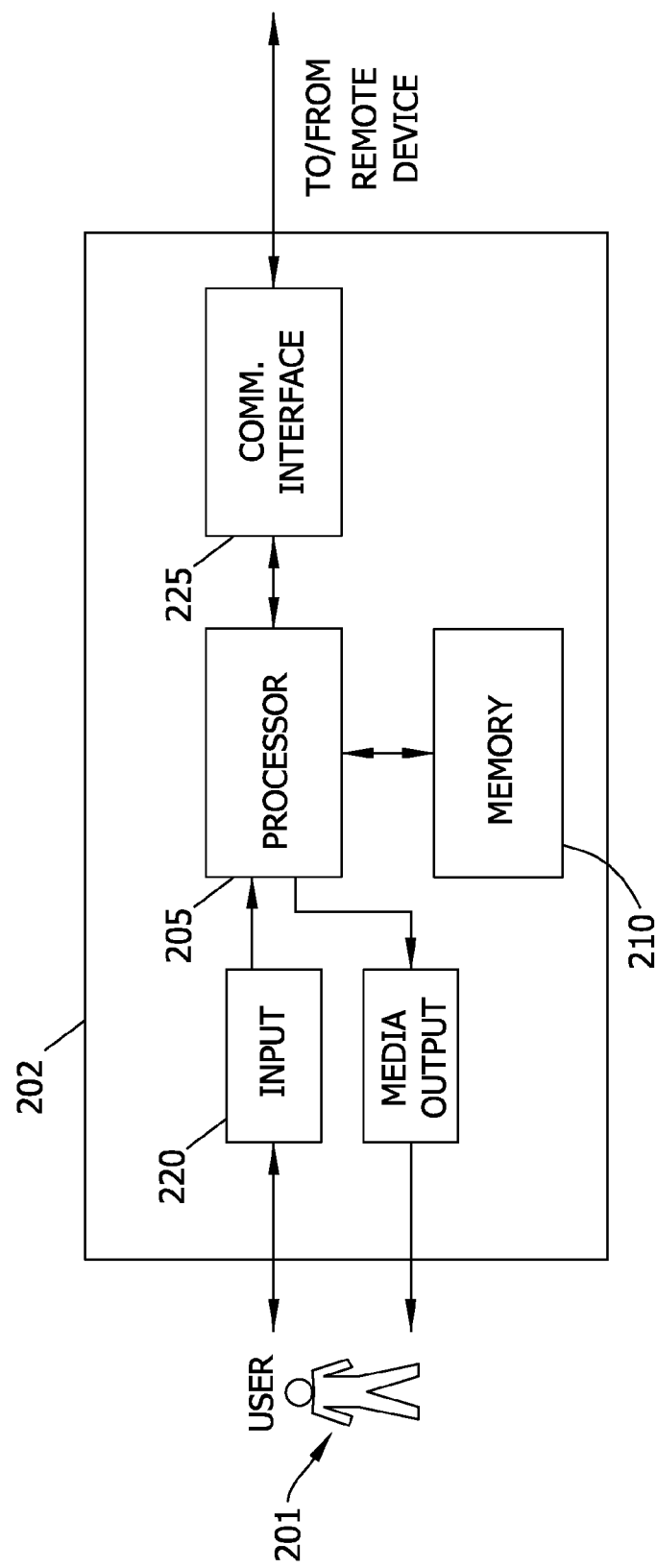

FIG. 4 illustrates an exemplary configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
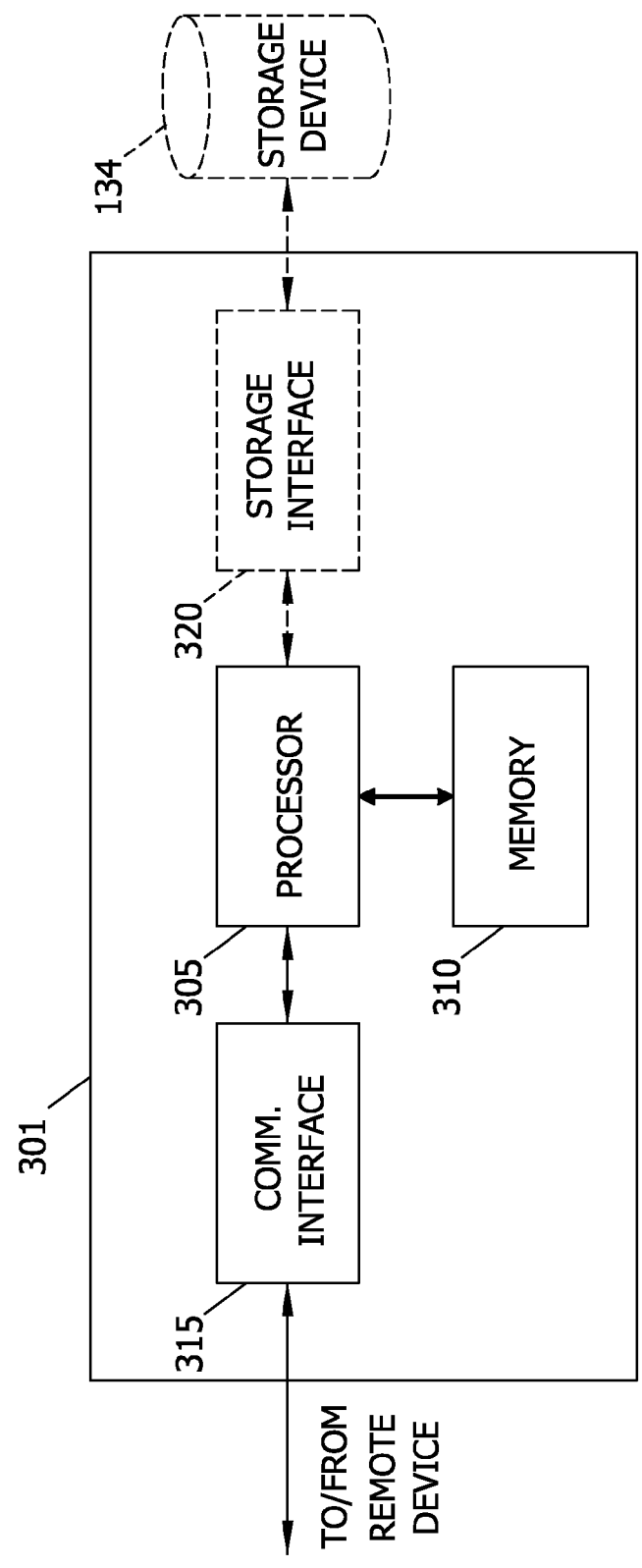

FIG. 5 illustrates an exemplary configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LENUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
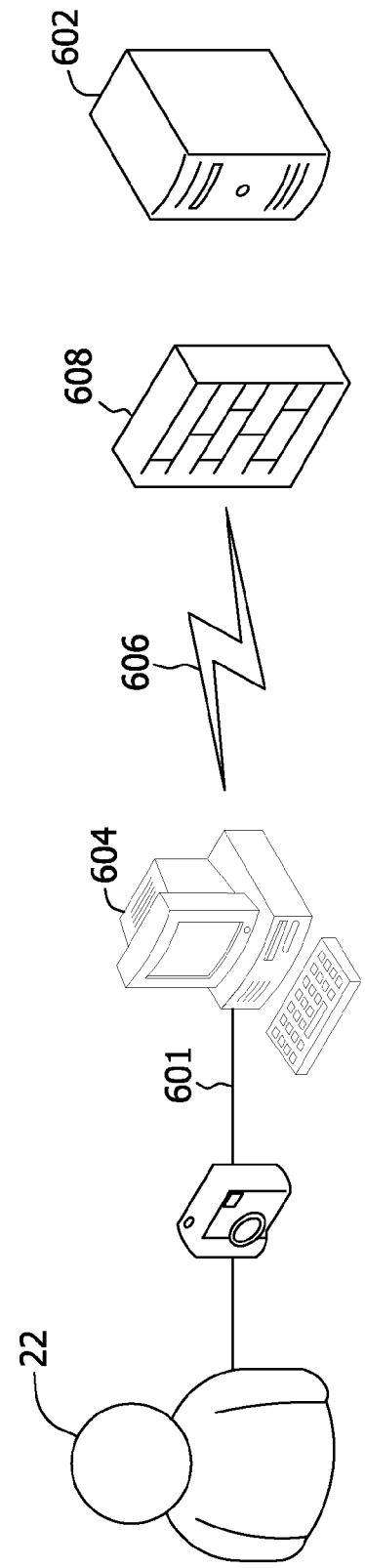

FIG. 6 is a schematic diagram of a photo identification (ID) payment card transaction verification system 121 (shown in FIG. 2) in accordance with an exemplary embodiment of the present invention. In the exemplary embodiment, cardholder 22 acquires a facial photo of himself and uploads the acquired photo 601 to a secure server 602 using a computer 604 communicatively coupled to secure server 602 through a network 606 and a firewall system 608. In one embodiment, secure serve 602 is embodied on server 112 (shown in FIG. 2). In various embodiments, secure server 602 may be embodied on a server located at a third party service provider (not shown) communicatively coupled to the transaction card system. Secure server 602 is configured to link the photo to the cardholder account 32 associated with cardholder 22 using a security protocol that verifies that cardholder 22 is the same individual depicted in the photo.

Figure 7:
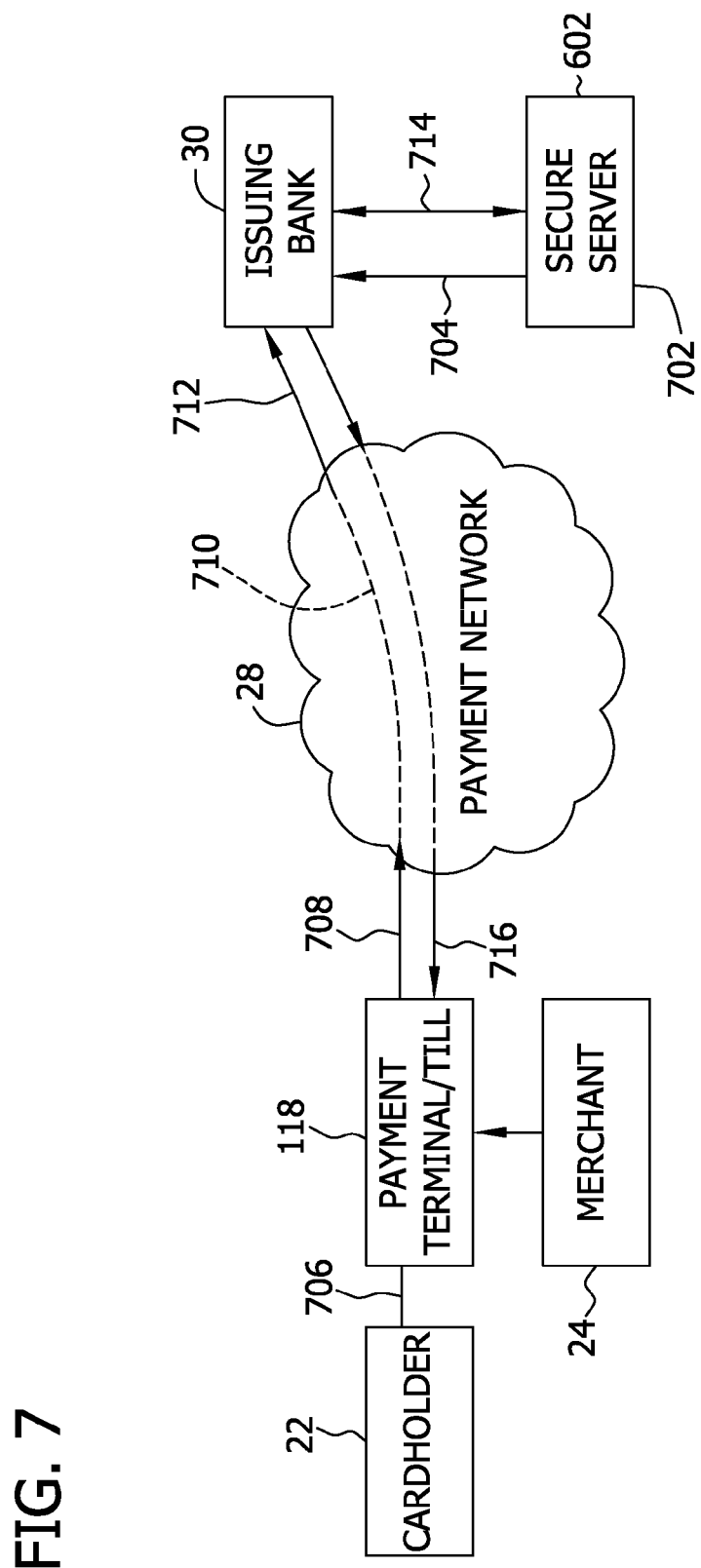

FIG. 7 is a schematic block diagram of photo ID payment card transaction verification system 121 in accordance with another exemplary embodiment of the present invention. In this exemplary embodiment, secure server 602 applies 702 a unique photo identifier to the photo downloaded by cardholder 22. The unique identifier is added 704 to the cardholders account details at issuing bank 30. During a payment card transaction, cardholder 22 presents 706 payment card for payment. Payment card information is used by terminal 118 to generate 708 an authorization request. In one embodiment, merchant 24 requests a verified photo be returned with the transaction authorization response. In various embodiments, the photo request is generated by default. The authorization request is routed 710 through payment network 28. Issuer 30 receives 712 the authorization request and accesses 714 secure server 602 where the photo is stored and attaches the photo to the authorization response. The authorization response is transmitted to payment terminal 118, where merchant 24 can manually verify 716 the photo received is actually cardholder 22 and approve/decline the transaction.

Figure 8:
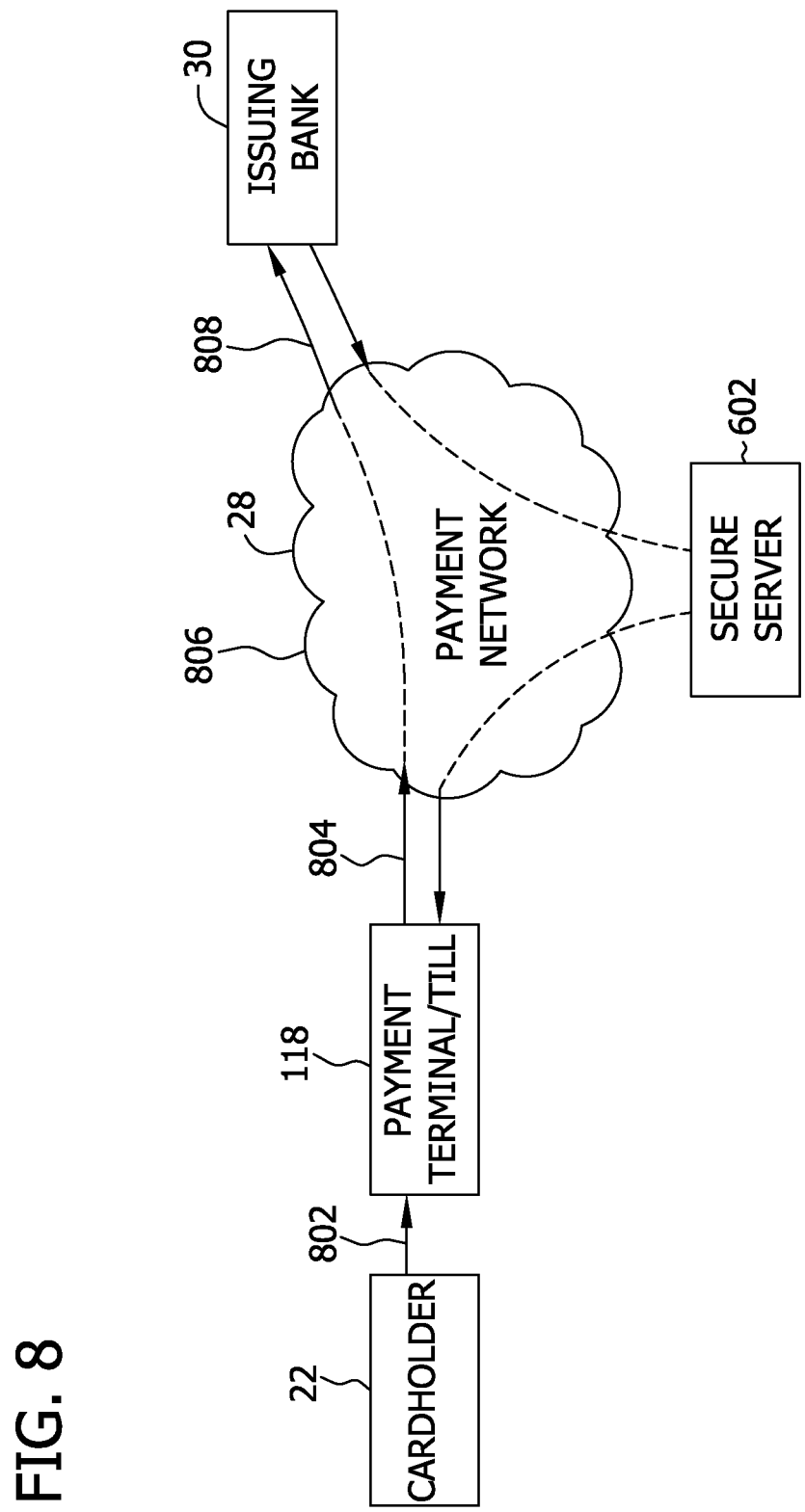

FIG. 8 is a schematic block diagram of photo ID payment card transaction verification system 121 in accordance with yet another exemplary embodiment of the present invention. In this exemplary embodiment, during a payment card transaction, cardholder 22 presents 802 card for payment. Payment card information is used by terminal 118 to generate 804 an authorization request. In one embodiment, merchant 24 requests a verified photo be returned with the transaction authorization response. In various embodiments, the photo request is generated by default. The authorization request is routed 806 through payment network 28. Issuer 30 receives 808 and processes the authorization request. Issuer 30 transmits the authorization response via a third party service, for example, but not limited to, a MasterCard on Behalf® service, which cross references the card information in the payment transaction with a photo on secure server 602 linked to that cardholders account. The photo is then attached to the authorization response. The authorization response is transmitted to payment terminal 118, where merchant 24 can manually verify 712 the photo received is actually cardholder 22 and approve/decline the transaction.

Figure 9:
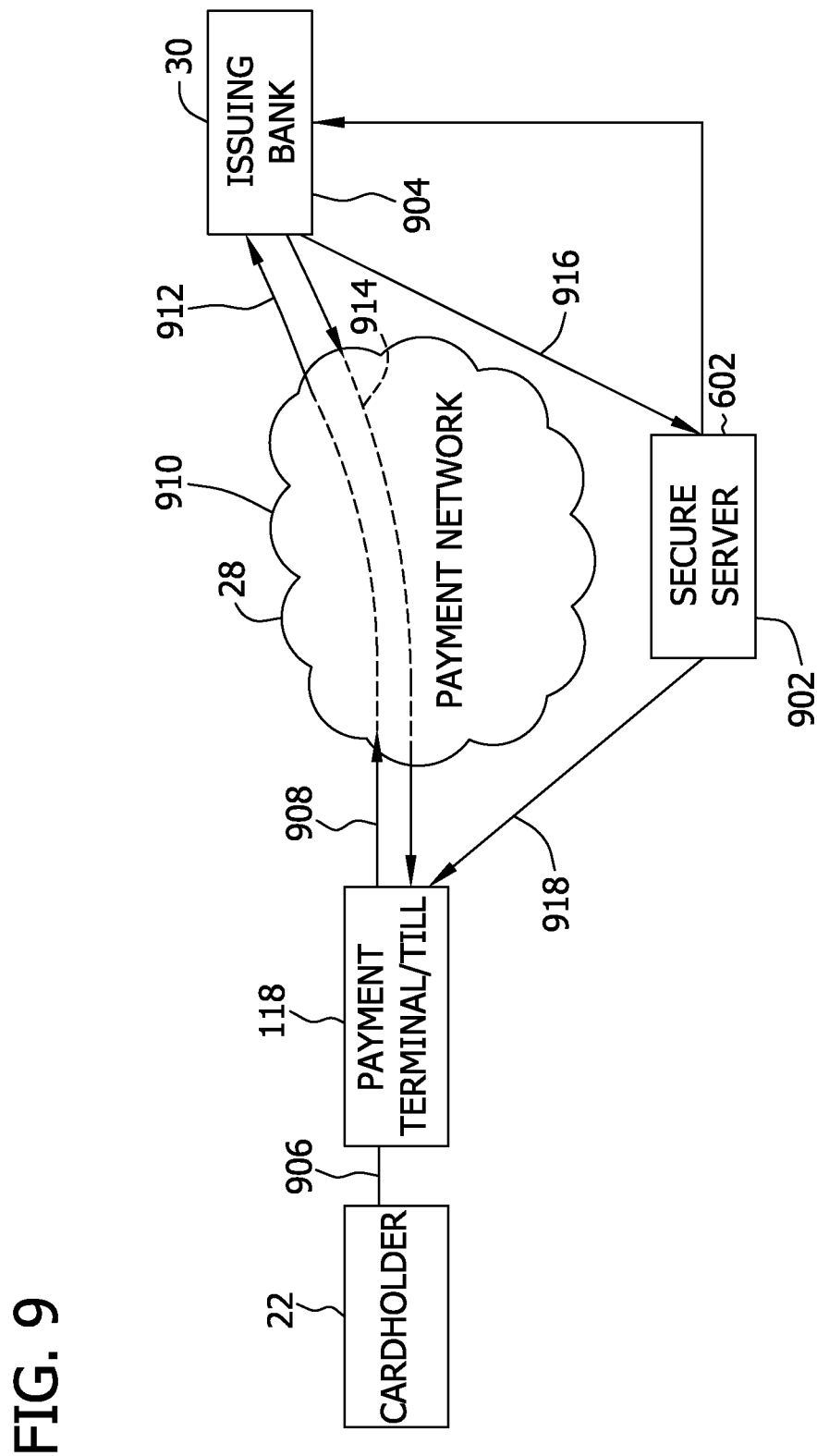

FIG. 9 is a schematic block diagram of photo ID payment card transaction verification system 121 in accordance with still another exemplary embodiment of the present invention. In this exemplary embodiment, secure server 602 applies 902 a unique photo identifier to the photo downloaded by cardholder 22. The unique identifier is added 904 to the cardholders account details at issuing bank 30. During a payment card transaction, cardholder 22 presents 906 payment card for payment. Payment card information is used by terminal 118 to generate 908 an authorization request. In one embodiment, merchant 24 requests a verified photo be returned with the transaction authorization response. In various embodiments, the photo request is generated by default. The authorization request is routed 910 through payment network 28. Issuer 30 receives 912 the authorization request. Issuer 30 transmits the authorization response to merchant terminal 118 through payment network 28. Issuer 30 also transmits 916 a request to secure server 602 for a photo of the cardholder 22 associated with the authorization request to be transmitted directly to merchant terminal 118 without passing through payment network 28. The photo is cross referenced with the authorization response. The authorization response is transmitted 914 to payment terminal 118, where merchant 24 can manually verify 916 the photo received directly from server 602 matches cardholder 22 and then approve or decline the transaction.

Figure 10:
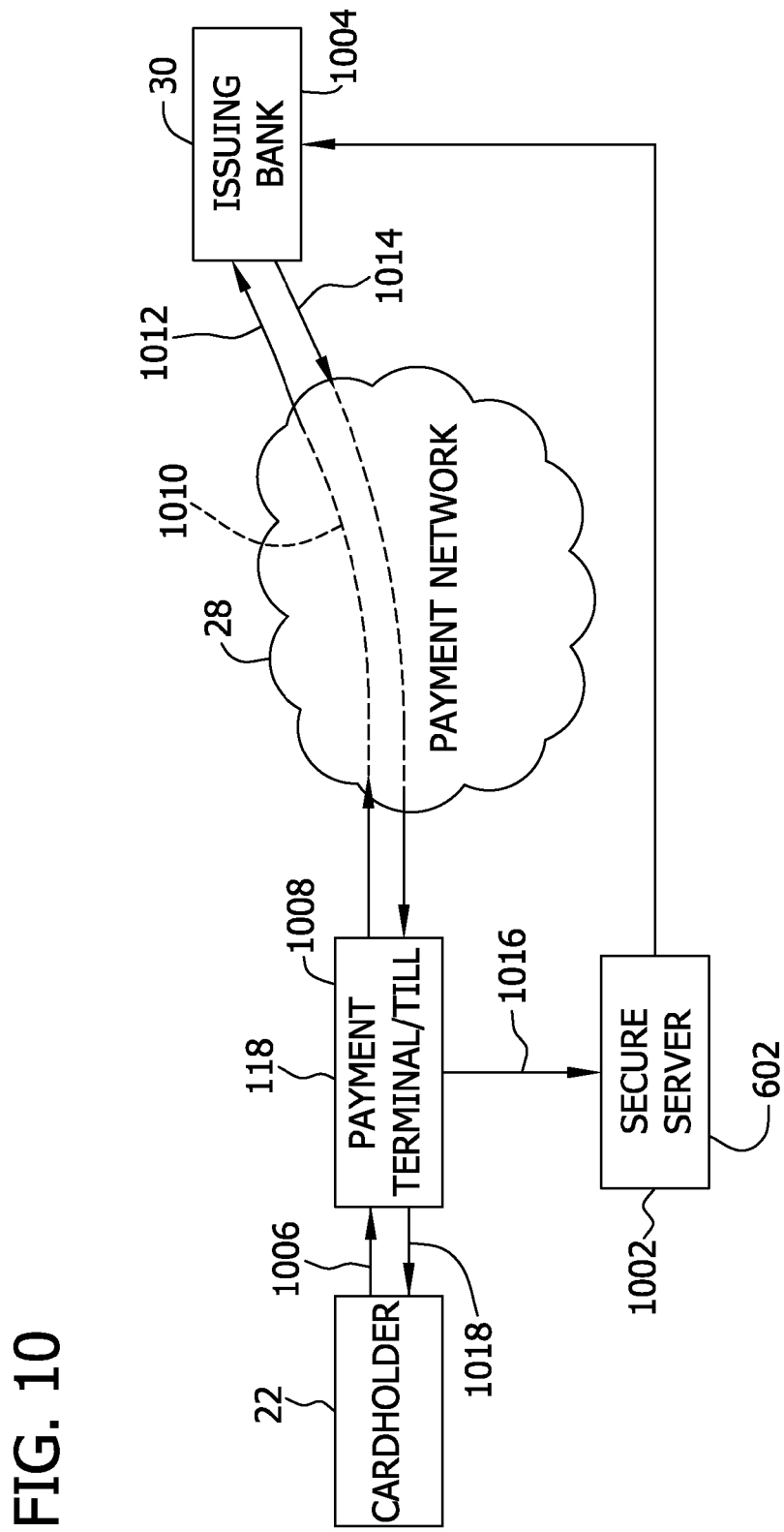

FIG. 10 is a schematic block diagram of photo ID payment card transaction verification system 121 in accordance with still yet another exemplary embodiment of the present invention. In this exemplary embodiment, secure server 602 applies 1002 a unique photo identifier to the photo downloaded by cardholder 22. The unique identifier is added 1004 to the cardholders account details at issuing bank 30. During a payment card transaction, cardholder 22 presents 1006 payment card for payment. Payment card information is used by terminal 118 to generate 1008 an authorization request. In one embodiment, merchant 24 requests a verified photo be returned with the transaction authorization response. In various embodiments, the photo request is generated by default. The authorization request is routed 1010 through payment network 28. Issuer 30 receives 1012 the authorization request. An authorization response is generated 1014 with a web link included enabling access to secure server 602 by merchant terminal 118 using the unique photo identifier to cross-reference to the correct photo. Merchant 24 uses 1016 the web link contained in the authorization response to access and display the photo. Merchant 24 can manually verify 1016 the photo received directly from server 602 matches cardholder 22 and then approve or decline the transaction.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for making available to a merchant a photo of a payment transaction card user during a transaction. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of transmitting a verified photo of a payment transaction account cardholder for comparison to a user of a payment card associated with the account provides a cost-effective and reliable means for providing a fraud detection mechanism to a payment card transaction. More specifically, the methods and systems described herein facilitate storing a verified photo of a payment card account owner at one or more of several locations, associating the photo with the payment card account, and transmitting the photo, a photo location, or a link to the photo to the merchant during a payment card transaction so the merchant can use the photo to ensure the person using the payment card at the merchants' location is, in fact, the account owner. As a result, the methods and systems described herein facilitate reducing fraud in payment card transactions in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A photo ID payment card transaction verification subsystem for use with a payment card interchange network, said subsystem comprising a secure server comprising a memory device and a processor in communication with the memory device, the photo ID payment card transaction verification computer subsystem is programmed to:
   receive a photo of a cardholder at the secure server, the photo verified to be of the cardholder;
   assign a unique photo identifier to the photo;
   store the photo and unique photo identifier on the secure server;
   transmit the unique photo identifier to an issuer associated with the cardholder's payment card account for associating the unique photo identifier to the cardholder's payment card account;
   receive, by the secure server, during a payment card transaction a photo request for the photo associated with the cardholder's payment card account, the photo request including the unique photo identifier; and
   using the unique photo identifier, transmit the photo, an access to the photo, or both the photo and an access to the photo to the merchant-during the payment card transaction.

2. A subsystem in accordance with claim 1, wherein the photo ID payment card transaction verification computer subsystem is programmed to:
   receive, during a payment card transaction, a photo request from an issuer bank, the photo request including the unique photo identifier assigned to the requested photo; and
   transmit the requested photo to the issuer bank for inclusion into an authorization request response to the merchant through the interchange network.

3. A subsystem in accordance with claim 1, wherein the photo ID payment card transaction verification computer subsystem is programmed to:
   receive, during a payment card transaction, a photo request from an issuer bank, the photo request including the unique photo identifier assigned to the requested photo; and
   transmit the requested photo and the unique photo identifier assigned to the requested photo directly to the merchant, the unique photo identifier used to associate the requested photo to the payment card transaction.

4. A subsystem in accordance with claim 1, wherein the secure server is forms a part of the payment card interchange network.

5. A subsystem in accordance with claim 1, wherein the photo ID payment card transaction verification computer subsystem is programmed to:
receive, from the merchant, during a payment card transaction, a request to view a web page hosted on the secure server, the request including the unique photo identifier assigned to a requested photo, the request resulting from a link to the webpage transmitted to the merchant; and
transmit the photo and the unique photo identifier directly to the merchant to permit the merchant to match the photo with an authorization request response.

6. A subsystem in accordance with claim 1, wherein the secure server comprises a standalone processor.

7. A subsystem in accordance with claim 1, wherein the secure server is positioned remotely from and is communicatively coupled to the payment card interchange network.

8. A method of reducing fraud in a payment card transaction system using a photo ID payment card transaction verification subsystem, the method comprising:
receiving, by a secure server communicatively coupled to the payment card transaction system, a photo of a cardholder, the photo verified to be of the cardholder;
receiving, by the secure server, during a payment card transaction an authorization request response from the issuer through a cross-reference service, the cross-reference service associating the payment card transaction information in the payment transaction with the photo of the cardholder; and
transmitting, by the secure server, the photo to the merchant with the received authorization request response during the payment card transaction.

9. The method of claim 8, further comprising
storing the photo on the secure server, which forms a part of the payment card interchange network.

10. The method of claim 8, further comprising
storing the photo on the secure server, which is positioned remotely from the payment card interchange network and is communicatively coupled to the payment card interchange network.

11. The method of claim 10, wherein receiving a photo of a cardholder comprising receiving a photo of the cardholder from the cardholder through a computer system communicatively coupled to the secure server.

12. The method of claim 8, further comprising:
receiving a photo of a merchant customer initiating a payment card transaction from a merchant during the payment card transaction;
retrieving the verified photo of the cardholder associated with the payment card account;
comparing the received photo and the retrieved photo using a facial pattern recognition system for scoring; and
transmitting the score to the merchant.

13. The method of claim 8, further comprising linking the photo to a payment card account associated with the cardholder using a security protocol that verifies that cardholder is the same individual depicted in the photo.

14. One or more non-transitory computer-readable storage media having computer-executable instructions embodied thereon, wherein when executed by a secure server comprising at least one processor, the computer-executable instructions cause the at least one processor to:
receive a photo of a cardholder at the secure server, the photo verified to be of the cardholder;
assign a unique photo identifier to the photo;
store the photo and unique photo identifier on the secure server;
transmit the unique photo identifier to an issuer associated with the cardholder's payment card account for associating the unique photo identifier to the cardholder's payment card account;
receive, by the secure server, during a payment card transaction a photo request for the photo associated with the cardholder's payment card account, the photo request including the unique photo identifier; and
using the unique photo identifier, transmit the photo, an access to the photo, or both the photo and an access to the photo to the merchant during a payment card transaction.

15. The computer-readable storage media of claim 14, wherein the computer-executable instructions further cause the at least one processor to:
receive, during a payment card transaction, a photo request from an issuer bank, the photo request including the unique photo identifier assigned to the requested photo; and
transmit the requested photo to the issuer bank for inclusion into an authorization request response to the merchant through the interchange network.

16. The computer-readable storage media of claim 14, wherein the computer-executable instructions further cause the at least one processor to:
receive the photo from a third party secure server using the unique photo identifier; and
transmit the photo with an authorization request response to the merchant through the interchange network,
receive, during a payment card transaction, a photo request from an issuer bank, the photo request including the unique photo identifier assigned to the requested photo; and
transmit the requested photo and the unique photo identifier assigned to the requested photo directly to the merchant, the unique photo identifier used to associate the requested photo to the payment card transaction.

17. The computer-readable storage media of claim 14, wherein the computer-executable instructions further cause the processor to
receive a photo of a merchant customer initiating a payment card transaction from a merchant during the payment card transaction;
retrieve the verified photo of the cardholder associated with the payment card account;
compare the received photo and the retrieved photo using a facial pattern recognition system for scoring; and
transmit the score to the merchant.

18. The computer-readable storage media of claim 14, wherein the computer-executable instructions further cause the at least one processor to:
receive, from the merchant, during a payment card transaction, a request to view a web page hosted on the secure server, the request including the unique photo identifier assigned to a requested photo, the request resulting from a link to the webpage transmitted to the merchant; and
transmit the photo and the unique photo identifier directly to the merchant to permit the merchant to match the photo with an authorization request response.

19. The computer-readable storage media of claim 14, wherein the computer-executable instructions further cause the at least one processor to link the photo to a payment card account associated with the cardholder using a security protocol that verifies that cardholder is the same individual depicted in the photo.

\* \* \* \* \*